(12) United States Patent
Schelberg et al.

(10) Patent No.: US 8,109,546 B2
(45) Date of Patent: Feb. 7, 2012

(54) BUMPER ASSEMBLIES WITH INDEPENDENTLY ALIGNED GARNISHES AND REFLECTORS

(75) Inventors: David William Schelberg, Farmington, MI (US); Mingher Fred Shen, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 218 days.

(21) Appl. No.: 12/351,493

(22) Filed: Jan. 9, 2009

(65) Prior Publication Data
US 2010/0176608 A1    Jul. 15, 2010

(51) Int. Cl.
*B60R 13/00* (2006.01)
(52) U.S. Cl. .......................... 293/117; 362/505; 359/548
(58) Field of Classification Search .............. 293/1, 117; 362/505, 549; 359/533, 544, 548, 549
See application file for complete search history.

(56) References Cited

U.S. PATENT DOCUMENTS

| | | | |
|---|---|---|---|
| 2,117,760 A | | 5/1938 | Douglas |
| 3,422,260 A | * | 1/1969 | Hedgewick ................... 362/458 |
| 3,467,822 A | | 9/1969 | Plume |
| 3,621,232 A | | 11/1971 | Hough et al. |
| 3,998,178 A | * | 12/1976 | Dutot et al. ................. 116/28 R |
| 4,794,500 A | * | 12/1988 | Bradley ......................... 362/549 |
| 4,831,503 A | * | 5/1989 | DeSantis et al. ............. 362/497 |
| 5,155,626 A | * | 10/1992 | Lester ........................... 359/524 |
| 5,402,266 A | * | 3/1995 | Coligionis ..................... 359/548 |
| 6,902,215 B1 | * | 6/2005 | Condeelis ...................... 293/117 |
| 7,055,999 B2 | | 6/2006 | Lin |
| 7,380,559 B2 | | 6/2008 | Son et al. |
| 7,534,021 B2 | * | 5/2009 | Naik et al. ..................... 362/549 |
| 7,572,016 B2 | * | 8/2009 | Nakade et al. ................ 359/533 |
| 2003/0035300 A1 | * | 2/2003 | Branstetter .................... 362/549 |
| 2004/0184278 A1 | * | 9/2004 | Cheron et al. ................ 362/505 |
| 2007/0182175 A1 | | 8/2007 | Naik et al. |
| 2008/0088141 A1 | | 4/2008 | Adachi et al. |
| 2009/0052201 A1 | * | 2/2009 | Ballinger et al. ............. 362/546 |
| 2009/0154184 A1 | * | 6/2009 | King et al. .................... 362/513 |
| 2009/0267364 A1 | * | 10/2009 | Crainic et al. ................ 293/117 |
| 2010/0032971 A1 | * | 2/2010 | Stoffel et al. ................. 293/155 |
| 2010/0096865 A1 | * | 4/2010 | Mckee et al. ................. 293/113 |
| 2010/0176608 A1 | * | 7/2010 | Schelberg et al. ............ 293/117 |

FOREIGN PATENT DOCUMENTS
JP       2007062617 A       3/2007
\* cited by examiner

*Primary Examiner* — Glenn Dayoan
*Assistant Examiner* — Melissa A Black
(74) *Attorney, Agent, or Firm* — Dinsmore & Shohl LLP

(57) ABSTRACT

A bumper assembly for a vehicle may include a bumper cover with a garnish ring and a reflector disposed therein. The garnish ring may include a garnish connector and a reflector bracket that includes a reflector connection hole. The bumper cover may include a receptacle that includes a garnish bracket with a clearance hole and a connector opening that corresponds to the garnish connector. When the garnish ring is positioned in the receptacle, the garnish connector may be received in the connector opening thereby aligning the garnish ring with the bumper cover and the clearance hole with the reflector connection hole. The reflector may include a connector post when disposed in the garnish ring, the connector post may extend through the reflector connection hole and the clearance hole and be fastened to the reflector bracket such that the reflector is aligned with the garnish ring.

20 Claims, 8 Drawing Sheets

BUMPER ASSEMBLIES WITH INDEPENDENTLY ALIGNED GARNISHES AND REFLECTORS

TECHNICAL FIELD

The present invention generally relates to bumpers for vehicles and, more specifically, to independently aligned garnishes and reflectors for vehicle bumpers.

BACKGROUND

Vehicles may include garnish rings or bezels around head or tail lamp reflectors positioned in either the front or rear bumpers. For example, a chrome garnish ring may surround a reflector as a styling accent. The garnish rings and reflectors are often separate components and, as such, must be connected and aligned upon installation in order to achieve the proper clearance and effect the desired appearance.

The alignment and connection of both the garnish ring and reflector may bring about multiple variables to consider during installation on the vehicle. The gap between each respective part as well as their alignment with one another may impact the overall presentation of a reflector assembly as well as the bumper or bumper cover in which they are installed. Where the garnish ring and reflector are independently connected directly to a vehicle bumper, their alignment with respect to one another and the vehicle bumper may be difficult to control.

Accordingly, a need exists for alternative reflectors and ring garnishes for vehicle bumpers.

SUMMARY

In one embodiment, a bumper assembly for a vehicle may include a bumper cover with a garnish ring and a reflector disposed therein. The garnish ring may include a plurality of garnish connectors that extend from a backside of the garnish ring and a reflector bracket that may include at least one reflector connection hole. The bumper cover may include at least one receptacle that includes a garnish bracket with a clearance hole and a plurality of connector openings that correspond to the garnish connectors. When the garnish ring is positioned in the at least one receptacle, the garnish connectors may be received in the connector openings of the garnish bracket thereby aligning the garnish ring with the bumper cover and the clearance hole of the garnish bracket with the reflector connection hole of the reflector bracket. The reflector may include a connector post that extends from a backside of the reflector and, when the reflector is disposed in the garnish ring, the connector post may extend through the corresponding reflector connection hole and the clearance hole and be fastened to the reflector bracket such that the reflector is aligned with the garnish ring.

In another embodiment, method for installing a reflector assembly in a bumper of a vehicle may include providing a bumper cover including a receptacle having a garnish bracket disposed therein. Providing a reflector assembly comprising a garnish ring and a reflector. Inserting the garnish ring in the receptacle of the bumper cover such that the garnish ring is connected to the garnish bracket and datumed to with the bumper cover. Inserting the reflector into the garnish ring such that the reflector is aligned and connected to the garnish ring.

In yet another embodiment, a vehicle may include a bumper assembly including a bumper cover, a garnish ring and a reflector. The bumper cover may include a garnish bracket including a clearance hole and at least one connector opening. The garnish ring may include a reflector connection hole and a garnish connector, wherein the garnish connector may be disposed in the at least one connector opening of the bumper cover such that the garnish ring may be aligned and connected to the bumper cover and the clearance hole of the bumper cover may be aligned with the reflector connection hole. The reflector may include a connector post, wherein the reflector may be disposed in the garnish ring such that the connector post extends through the reflector connection hole and the clearance hole and may be secured to the bumper cover with a nut thereby securing the reflector and garnish ring to the bumper cover and aligning the reflector with the garnish ring.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
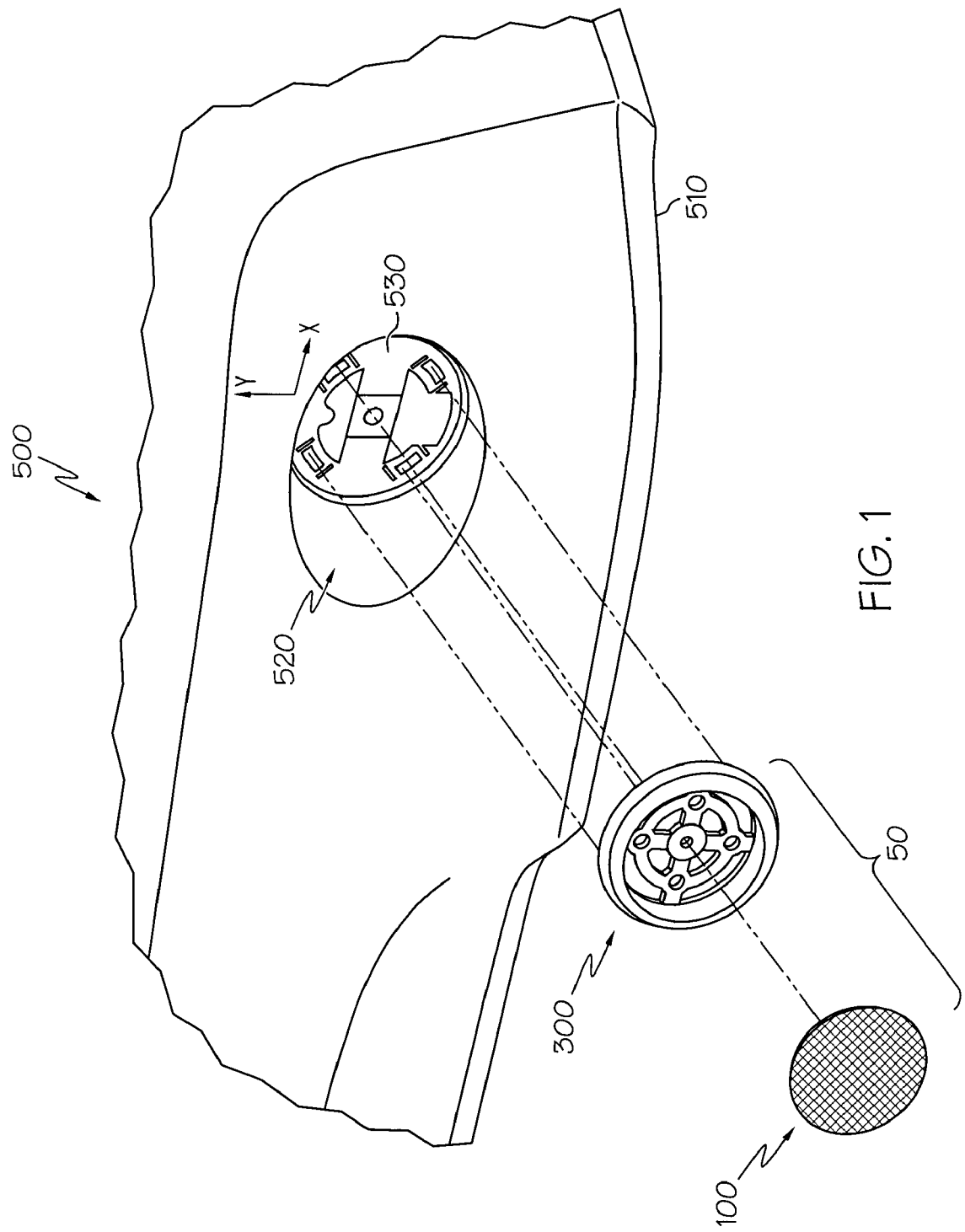
FIG. 1 depicts an exploded view of a reflector assembly comprising a reflector and garnish ring connected to a vehicle bumper according to one or more embodiments shown and described herein.

FIG. 1 generally depicts one embodiment of a vehicle bumper with a reflector assembly comprising a garnish ring and a reflector. The vehicle bumper generally comprises a garnish bracket disposed within a receptacle in the vehicle bumper. A garnish ring with a reflector bracket is connected to the garnish bracket of the receptacle such that the gap between the garnish ring and receptacle is uniform about the perimeter of the garnish ring. A reflector is installed and aligned with the garnish ring such that the gap between the reflector and the garnish ring is uniform. The connection between the reflector and garnish ring is independent of the connection between the garnish ring and garnish bracket so that the alignment and gaps between the reflector, garnish ring and bumper cover may be independently controlled. The garnish ring, bumper cover and reflector, as well as methods for assembling the garnish ring, bumper cover and reflector will be discussed in more detail herein.

Figure 2A:
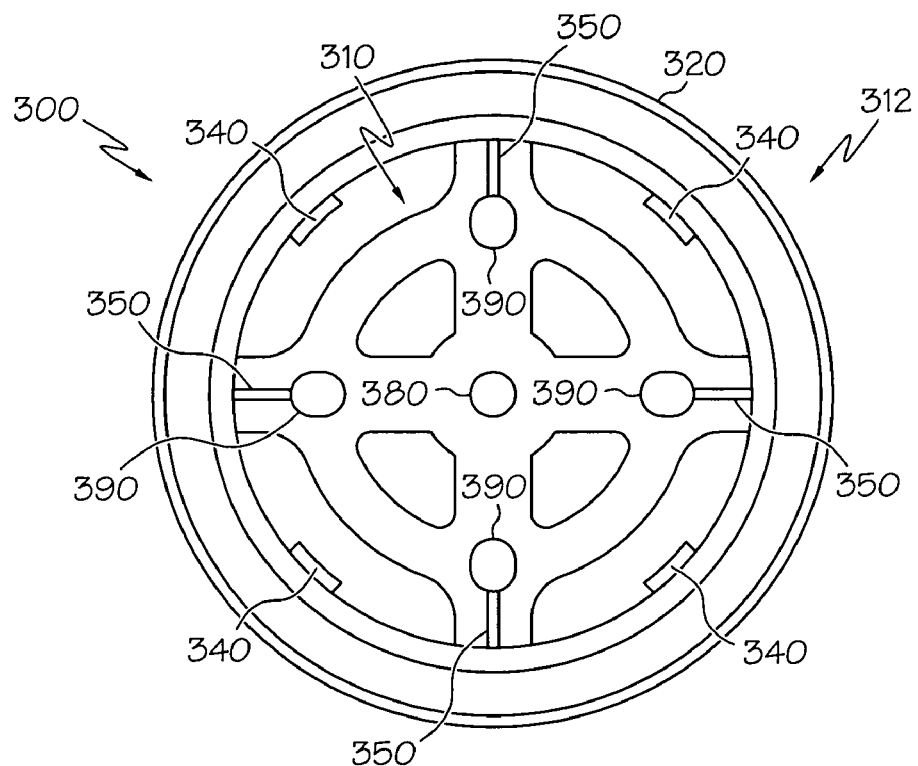
FIG. 2A depicts a front view of a garnish ring according to one or more embodiments shown and described herein.
Figure 2B:
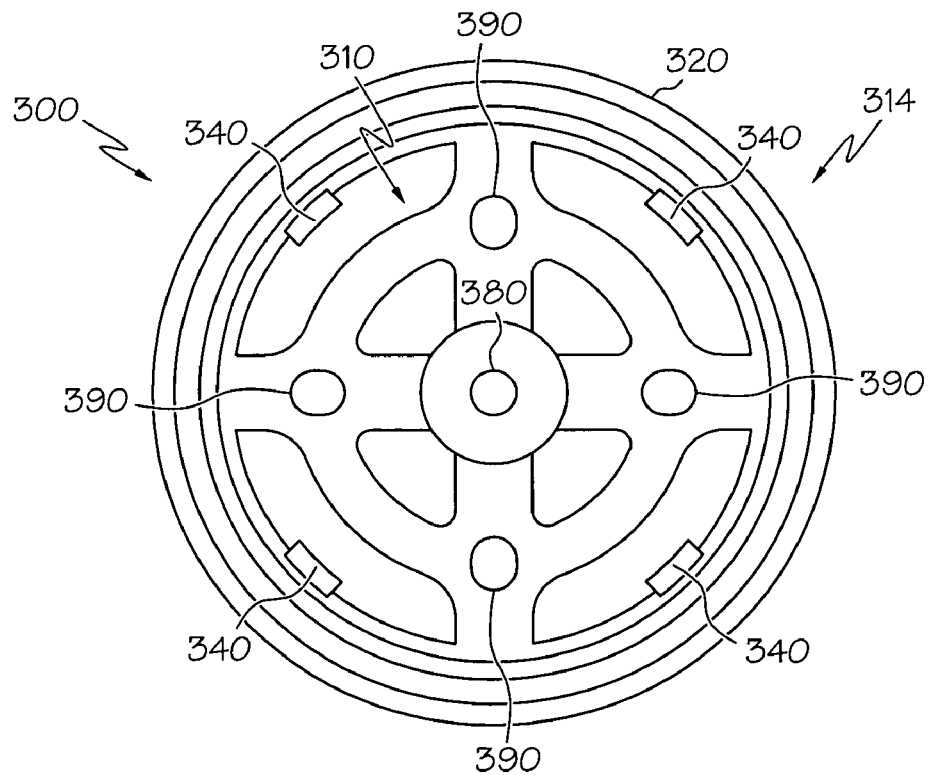
FIG. 2B depicts a back view of a garnish ring according to one or more embodiments shown and described herein.

Referring to FIGS. 2A and 2B, one embodiment of a garnish ring 300 is depicted from a front view and a back view, respectively. The front view in FIG. 2A depicts the front side of the garnish ring 312 which generally faces outward, away from the vehicle bumper 500. The back view shown in FIG. 2B depicts a backside of the garnish ring 314 which generally faces inward towards the vehicle (not shown).

The garnish ring 300 may comprise a peripheral ring 320 and a reflector bracket 310. In the embodiment shown, the peripheral ring 320 generally defines an area in which the reflector bracket 310 is disposed. In the embodiment shown in FIGS. 2A and 2B, the peripheral ring 320 is substantially circular in shape. However, it will be understood that the peripheral ring 320 may take on other geometries including, but not limited to, oval, elliptical or the like.

The peripheral ring 320 may serve as a decorative garnish or bezel of the reflector assembly. In one embodiment, the front side of the peripheral ring 320 may be a decorative surface to accent the area surrounding the reflector (not shown). For example, an outer surface of the peripheral ring 320 may comprise chrome or another well polished surface. The peripheral ring 320 may comprise a plastic or an alloy, or, in the alternative, the peripheral ring 320 may be dipped, coated, painted or otherwise covered with a material different from the material of the peripheral ring. For example, in one embodiment, the peripheral ring 320 may comprise a plastic body (e.g., polypropylene) with a coating to give the peripheral ring the appearance of being chrome plated. In addition, the peripheral ring 320 may be polished, chemically etched or otherwise treated to create the desired appearance.

The reflector bracket 310 of the garnish ring 300 may either be integral with the peripheral ring 310 or independently connected with the peripheral ring 310. Likewise, the reflector bracket may be composed of the same or different materials as the peripheral ring. In one embodiment, as shown in FIGS. 2A and 2B, the reflector bracket 310 is integrally formed with the peripheral ring 320 such as when the peripheral ring 320 and the reflector bracket 310 are injection molded or otherwise formed as a single piece. In another embodiment, the peripheral ring 320 and reflector bracket 310 are independently formed and thereafter attached using adhesives, welding or the like.

In the embodiment shown in FIGS. 2A and 2B, the reflector bracket has a cross-like configuration generally comprising two portions which extend across the diameter of the peripheral ring 320 in two directions. However, it should be understood that the reflector bracket 310 may have other configurations. For example, in one embodiment (not shown), the reflector bracket 310 may substantially fill the area defined by the peripheral ring 320. In another embodiment (not shown), the reflector bracket 310 may comprise a single portion extending across a diameter of the area defined by the peripheral ring 320.

The reflector bracket 310 of the garnish ring 300 may generally comprise one or more connectors or attachment points that enable a connection between the peripheral ring 320 and a bumper cover (not shown) and/or a reflector (not shown). For example, in one embodiment, as shown in FIGS. 2A and 2B, the reflector bracket 310 may comprise a reflector connection hole 380. The reflector bracket 310 may also comprise at least one reflector anti-rotation hole 390. The reflector connection hole 380 and the reflector anti-rotation hole 390 may facilitate in the alignment and connection of the reflector assembly as discussed further herein. In one embodiment, a single reflector connection hole 380 may be substantially centered on the reflector bracket 310 and configured to receive a connector from a reflector (not shown). However, it should be understood that the reflector connection hole 380 may be positioned at other locations on the reflector bracket 310 in order to achieve the proper alignment of the reflector (not shown) with the garnish ring 300.

In one embodiment, the reflector connection hole 380 may be considered a tight fit hole. For example, in one embodiment, the reflector connection hole 380 is sized to receive a reflector stud 150 having a 5mm diameter. In order to maintain the proper alignment between the reflector and the garnish ring, the reflector connection hole 380 may be sized such that, when the reflector stud is disposed in the reflector connection hole 380, there is a 0.1 mm gap between the reflector stud and the reflector connection hole 380. Accordingly, the reflector connection hole may have a 5.2 mm diameter. While this example recites a reflector connection hole 380 having a 5.2 mm diameter and a reflector stud having a 5 mm diameter, it should be understood that other dimensions for the reflector stud and the reflector connection hole 380 may be possible in order to achieve the desired spacing between the reflector and the garnish ring 300 as well as the appropriate tolerances for assembly.

Further, one or more reflector anti-rotation holes 390 may be disposed about the reflector bracket. For example, in the embodiment shown in FIGS. 2A and 2B, the reflector anti-rotation holes 390 may be disposed between the reflector connection hole 380 and the peripheral ring 320. In another embodiment, the reflector bracket 310 may comprise multiple reflector connection holes 380 and/or a single reflector anti-rotation hole 390.

The garnish ring 300 may further comprise additional connection elements to facilitate connecting and aligning the garnish ring 300 with the bumper cover and/or reflector. In one embodiment, the garnish ring 300 may comprise a plurality of garnish connectors to facilitate connecting the garnish ring 300 to a bumper cover (not shown). The garnish connectors may be used to constrain the garnish ring 300 on the vehicle bumper 500 in the X and Y directions shown (as shown in FIG. 1) during installation of the reflector assembly 50 to the vehicle bumper 500. Accordingly, the garnish connectors may be used to align the garnish ring 300 to the bumper cover 510 such that the gap between the garnish ring 300 and bumper cover 510 is maintained. Further, the garnish connectors also serve to temporarily set or affix the garnish ring to the bumper cover 510 until the reflector is installed in the ring garnish 300 and bumper cover 510.

As depicted in FIGS. 2A and 2B, the garnish connectors may comprise four substantially hook shaped clips 340 operable to engage with corresponding holes disposed on a garnish bracket of the bumper cover (not shown). The plurality of connectors may be disposed about the backside of the garnish ring 314 and extend outwardly away from the garnish ring 300. While the embodiment of the garnish ring 300 shown herein depicts the garnish ring as comprising four garnish connectors, it will be understood that the garnish ring 300 may comprise any number of garnish ring connectors suitable for securing the garnish ring to a bumper cover. Further, while the garnish connectors are described herein as being substantially hook-shaped clips, it should be understood that the garnish connectors may be of any type suitable for joining the garnish 300 with corresponding connectors disposed in the bumper cover as will be described further herein.

In another embodiment, the garnish ring 300 may further comprise one or more tuning ribs 350. Shown in FIG. 2A, the tuning ribs 350 may be symmetrically disposed about the front side of the garnish ring 312 and may extend from the reflector bracket 310. The tuning ribs 350 may ensure that, when a reflector is disposed in the bumper cover and connected to the reflector bracket, the reflector and the garnish ring are properly oriented with respect to one another.

The reflector 100 of the reflector assembly 50 may comprise a reflector body 110 and a reflective surface 120. The reflector 100 may have a shape which generally corresponds to the shape of the area defined by the peripheral ring 320 of the garnish ring 300. Accordingly, in the embodiments shown, the reflector 100 is substantially circular in shape. However, it should be understood that the reflector 100 may comprise different shapes, including, but not limited to, oval, elliptical and the like.

Figure 3A:
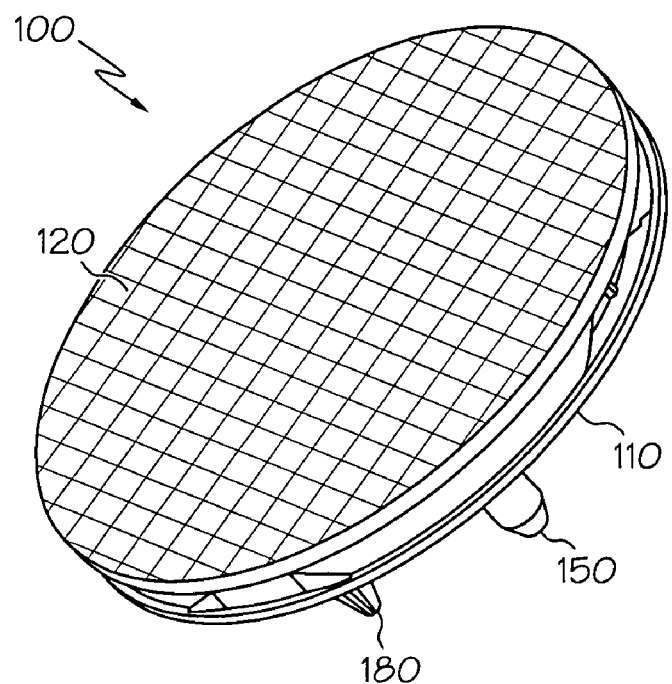
FIG. 3A depicts a reflector with a reflective surface according to one or more embodiments shown and described herein.
Figure 3B:
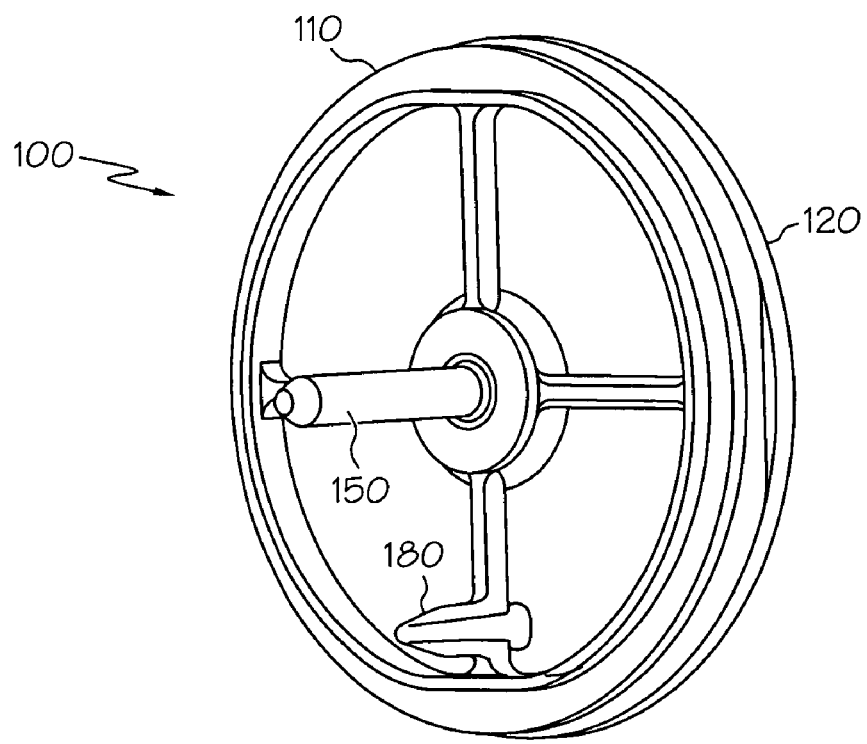
FIG. 3B depicts a back view of a reflector with a reflector body according to one or more embodiments shown and described herein.

The reflector body 110 may generally comprise a plastic, alloy or another suitable material. In one embodiment, as shown in FIG. 3B the reflector body 110 may comprise injection molded plastic.

The reflector body 110 of the reflector 100 may comprise a connector 150 such as a connector post (e.g., a stud or screw) to engage the reflector 100 with the garnish ring 300 and bumper cover 510. In the alternative, a clip, snap, or other suitable connector, or any plurality or combination thereof, may be employed to align and connect the reflector 100 to the garnish ring 300. The connector 150 may extend from the backside or rear of the reflector body 110 and is generally positioned to be received in the reflector connection hole 380 of the garnish ring 300 such that the reflector 100 and the garnish ring 300 are aligned with one another. In one embodiment, as depicted in FIGS. 3A and 3B, the connector 150 may comprise a reflector stud acting as a connector post. The reflector stud may be disposed on the reflector body 110 opposite the reflective surface 120 and extend away from the reflector 100. The reflector stud may be integrally formed with the reflector body 110 or otherwise engaged with the reflector body 110 such as when the reflector stud is threaded into a corresponding hole in the reflector body 110. The reflector stud may be threaded to receive a nut or otherwise be inserted into a corresponding threaded connector. As described above, the reflector stud 150 may be positioned and configured to pass through the reflector connection hole 380 on the garnish ring 300 when, referring to FIGS. 1, 3A and 3B, the reflector is disposed in the garnish ring.

The reflective surface 120 may be secured or connected to the front side of the reflector body 110, or, in the alternative, the reflective surface 120 may be integral with the reflector body 110. When the reflector 100 is positioned in the vehicle bumper, the reflective surface 120 may face outwards from the vehicle bumper to provide a visual indicator of the location of the vehicle. In one embodiment, the reflective surface may comprise a translucent material, such as plastic or glass, having a reflective foil disposed therein. The translucent material may be tinted such as when the reflective surface is white, red, orange or another suitable color. While specific reference has been made herein to the reflective surface 120 comprising a plastic or glass material with a reflective foil, it should be understood that the reflective surface 120 may comprise other materials such as, for example, a metal or composite material having a reflective coating. Further, in some embodiments (not shown), the reflector 100 may comprise a light source such as an incandescent lamp, an LED or similar light source, which may provide internal illumination to the reflector 100.

In one embodiment, the reflector 100 may further comprise an anti-rotation pin 180 extending from the reflector body 110 in a direction opposite the reflective surface 120. The anti-rotation pin 180 may be configured to be received in the anti-rotation hole 390 of the garnish ring to limit or prevent rotation of the reflector during connection of the reflector assembly to the bumper assembly as discussed further herein. In another embodiment, a plurality of anti-rotation pins 180 may be disposed about the reflector body 110 to limit or prevent rotation.

Figure 4A:
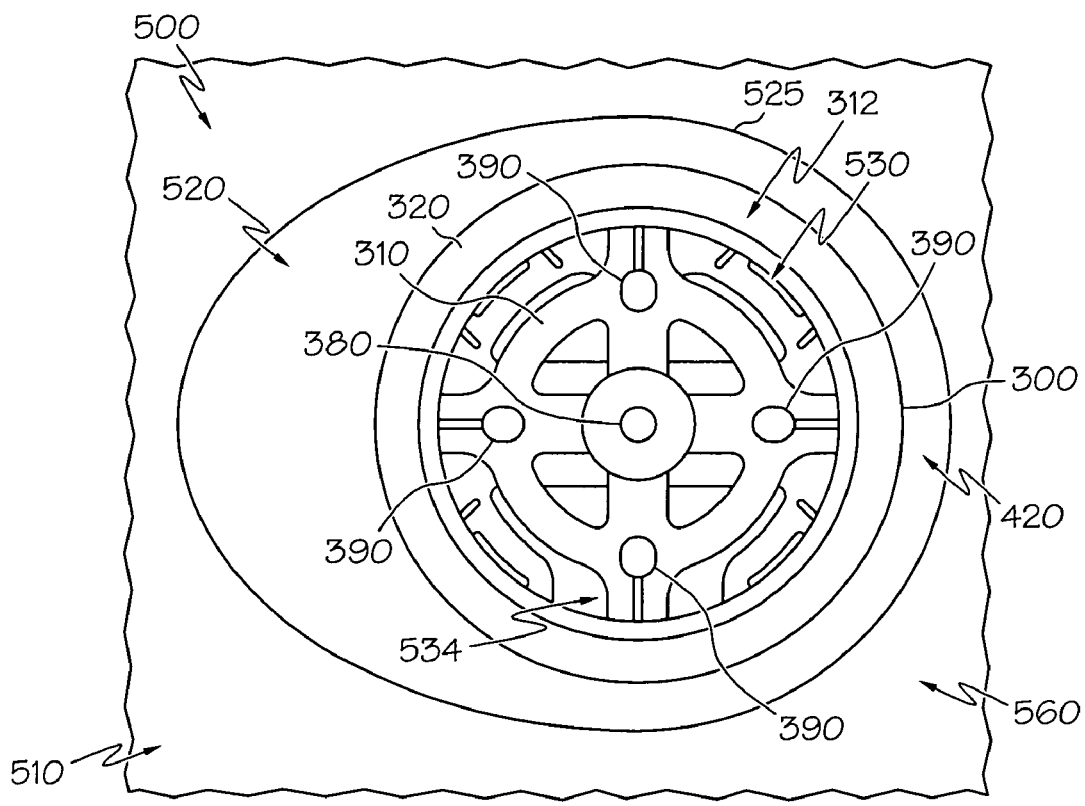
FIG. 4A depicts an external vehicle view of a receptacle with a garnish bracket according to one or more embodiments shown and described herein.
Figure 4B:
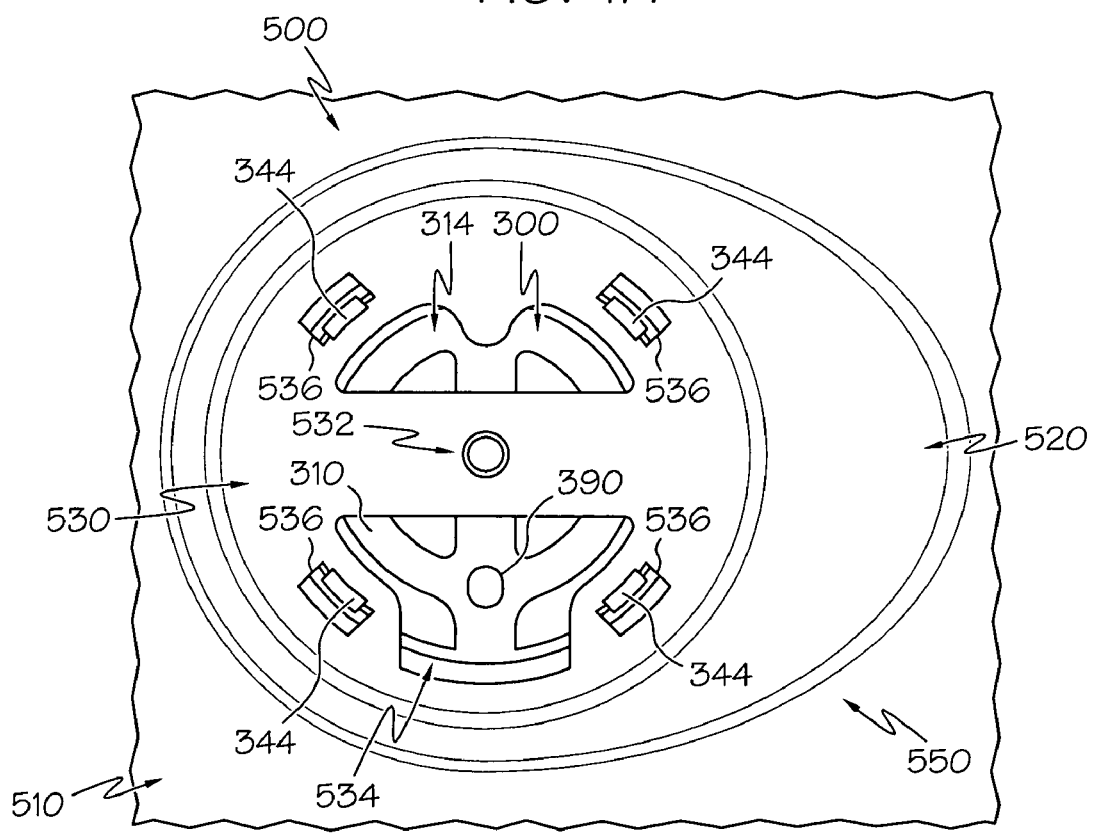
FIG. 4B depicts an internal vehicle view of a receptacle with a garnish bracket according to one or more embodiments shown and described herein.
Figure 4C:
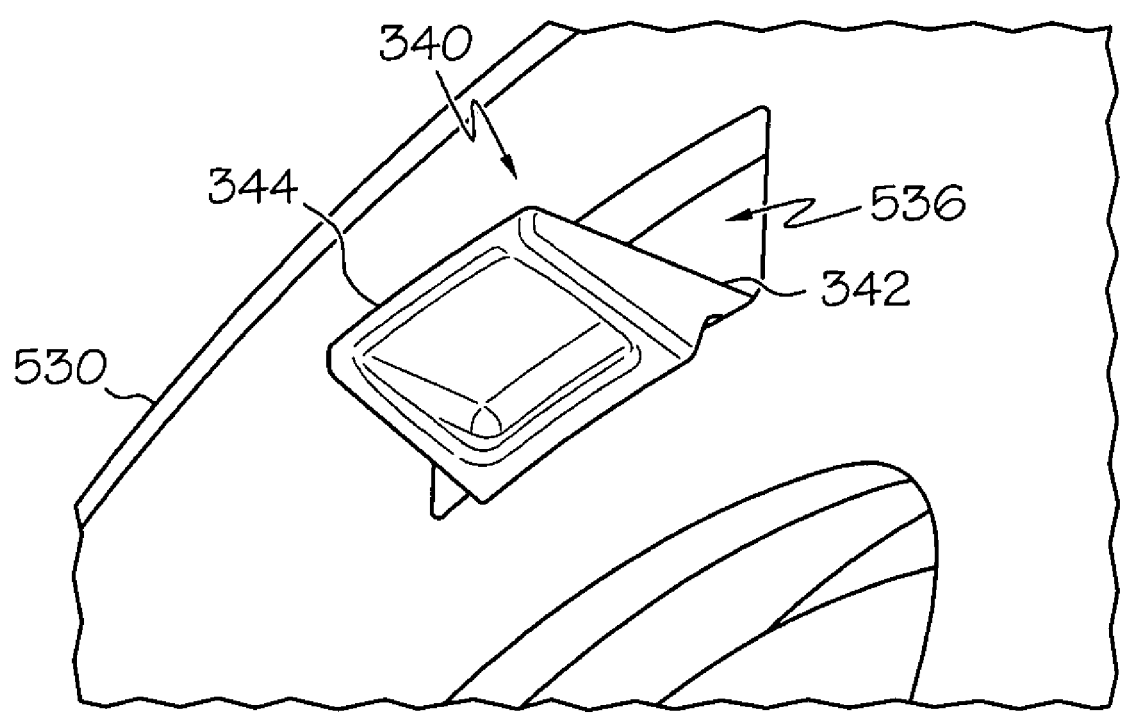
FIG. 4C depicts a close-up view of a connection between a garnish ring and a garnish bracket according to one or more embodiments shown and described herein.

Referring now to FIGS. 1 and 4A-4C, in one embodiment, the vehicle bumper 500 may comprise a bumper cover 510 disposed over a bumper support (not shown). The bumper cover 510 may comprise a receptacle 520 disposed in the bumper cover 510. The receptacle 520 may provide a recess or cavity to house a reflector assembly. The receptacle 520 may be shaped to receive the ring garnish 300 and reflector 100. Accordingly, in the embodiments shown, the receptacle 520 may generally have a substantially circular configuration. However, it will be understood that the receptacle 520 may have other configurations, depending on the shape of the ring garnish 300, including, but not limited to, oval, elliptical and the like. FIG. 4A depicts the receptacle 520 from the bumper cover exterior, while FIGS. 4B and 4C depict the receptacle 520 from the bumper cover interior 550. The bumper cover 510 may comprise a polymer, alloy or other suitable material for forming a bumper cover. In one embodiment, as depicted in the embodiments described herein, the bumper cover 510 may comprise an injection molded polymer material secured over a metallic bumper support (not shown).

Figure 5:
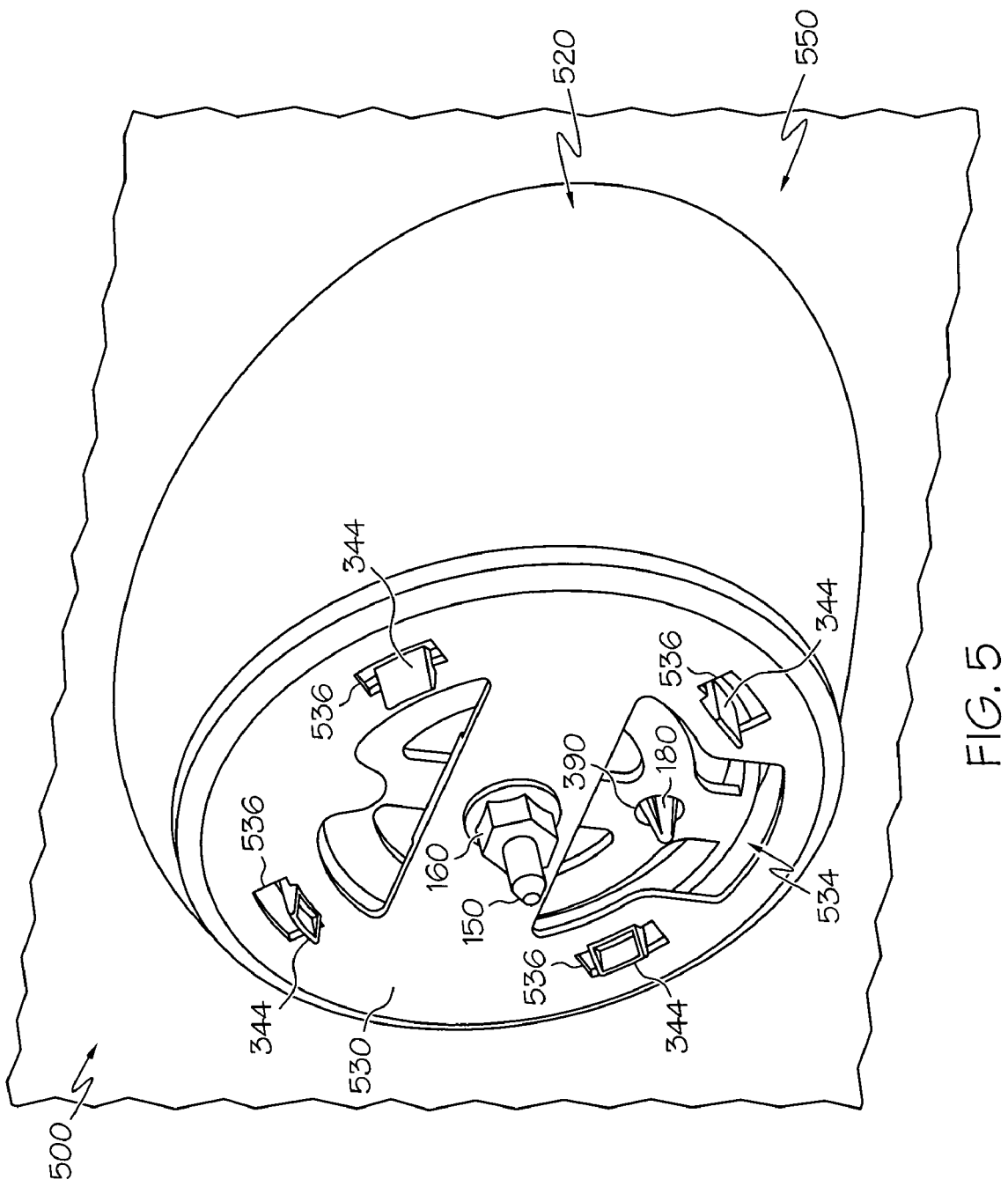
FIG. 5 depicts an internal vehicle view a reflector assembly connected to a receptacle according to one or more embodiments shown and described herein.

A garnish bracket 530 may be disposed in the receptacle 520. The garnish bracket 530 may facilitate the connection of the reflector assembly 50 to the bumper cover 510. As is clearly depicted in FIGS. 1 and 5, the garnish bracket 530 may form a rear wall along the interior of the receptacle 520. The garnish bracket 530 may limit the depth of insertion of the reflector assembly 50, and therefore the reflector 100 and the garnish ring 300, into the receptacle 520. The garnish bracket 530 may comprise a plastic, alloy or any other suitable material. In one embodiment, the garnish bracket 530 may be an injection molded plastic material. The garnish bracket 530 may be integral with the bumper cover 510 such as when the garnish bracket 530 is integrally formed with the bumper cover 510 or permanently joined to the bumper cover 510. In the alternative, the garnish bracket 530 may be removably connected to the bumper cover 510.

In one embodiment, the garnish bracket 530 may comprise a clearance hole 532, an anti-rotation pin gap 534 and connector openings 536. The clearance hole 532 may be sized such that a reflector connector may pass through the clearance hole 532 when the reflector assembly is inserted in the receptacle 520. Likewise, the anti-rotation pin gap 534 and connector openings 536 may be positioned in the receptacle 520 such that, when the reflector assembly 50 is positioned in the receptacle, the anti-rotation pin 180 of the reflector 100 is received in the anti-rotation pin gap 534 and the garnish connectors of the garnish ring 300 are received in the connector openings 536. In another embodiment, various shapes of the clearance hole 532, anti-rotation pin gap 534, and connector openings 536 may be employed to receive alternatively configured connector posts, anti-rotation pins and/or garnish connectors.

Referring now to FIGS. 1, 4A, 4C, and 5, in use, the first part of the reflector assembly 50, the garnish ring 300, may be aligned with and connected to the bumper cover 510 during assembly of the bumper cover 510. In one embodiment, alignment and connection of the garnish ring 300 with the bumper cover 510 is achieved with a plurality of garnish connectors such as clips 340. The garnish ring 300 is positioned in the receptacle 520 in the bumper cover 510 such that the clips 340 of the garnish ring 300 are received in the corresponding connector openings 536 disposed about the garnish bracket 530. The clips 340 and connector openings 536 may be disposed in a substantially similar alignment so that each clip 340 is received in a corresponding connector opening 536. More specifically, in one embodiment, the clips 340 may comprise an arm 342 and a head 344. The arm 342 may extend away from the garnish ring 300 while the head 344 may be disposed about an end of the arm opposite the garnish ring 300 to form a hook end. For example, the clips 340 may be in the form of a J-hook or T-hook. In one embodiment, four substantially hook-shaped clips 340 may be uniformly spaced about the backside of a garnish ring 300. Likewise, four connector openings 536 may be disposed about the garnish bracket in a similar configuration. When the garnish ring 300 is inserted into the receptacle 520 in the bumper cover 510, the four clips 350 may engage with the four connector openings 536. The heads 344 of the clips 340 may pass through the connector openings 536 thereby connecting the garnish ring 300 to the bumper cover 510 via the garnish bracket 530 such that the garnish ring 300 is aligned with or datumed to the bumper cover 510.

Referring to FIGS. 1-5, the second part of the reflector assembly 50, the reflector 100, may align and connect with the reflector bracket 310 on the garnish ring 300. In one embodiment, the garnish ring 300 may first be connected to the garnish bracket 530 on the vehicle bumper 500 as described above. The reflector 100 may then be aligned and connected to the garnish ring 300 by positioning the reflector 100 in the garnish ring 300 such that the reflector stud 150 passes through the aligned reflector connection hole 380 and clearance hole 532. A reflector nut 160 may then be secured onto the reflector stud 150 so that the reflector 100 is connected and aligned or datumed to the garnish ring 300. The reflector nut also secures the reflector assembly to the bumper cover 510. The clearance hole 532 on the garnish bracket 530 allows the reflector stud 150 to pass through the vehicle bumper 500 uninterrupted. Depending on the configuration of the connector post used on the reflector 100, the clearance hole 530 may not be necessary. For example, where the connection is achieved through adhesives, snaps or the like, the clearance hole 530 may not be necessary to accommodate a protruding piece.

In one embodiment, when the reflector 100 comprises an anti-rotation pin 180 and the ring garnish 300 comprises reflector anti-rotation holes 390, the anti-rotation pin 180 may extend toward the garnish ring 300 and contact and interfere with the reflector bracket 310 if not properly aligned with a reflector anti-rotation hole 390. This may prevent the reflector from being improperly positioned in the ring garnish 300. When aligned, the anti-rotation pin 180 may extend through a reflector anti-rotation hole 390 thereby aligning the reflector 100 with the garnish ring 300 and preventing the reflector 100 from rotating when the reflector nut 160 is installed.

In another embodiment, the garnish bracket 530 of the bumper cover 510 may further comprise an anti-rotation pin gap 534 to allow the anti-rotation pin 180 to pass through the garnish bracket 530 uninterrupted. When the reflector anti-rotation holes 390 of the garnish ring 300 are not aligned with the anti-rotation holes of the bumper cover 510, the anti-rotation pin 180 may contact and interfere with the garnish bracket 530 and/or the reflector bracket preventing a proper connection between the reflector assembly 50 and the vehicle bumper 500.

When the reflector 100 is connected to the garnish ring 300, the tuning ribs 350 may contact and interfere with the reflector body 110 to ensure the appropriate spacing and angular alignment of the reflector 100 and garnish ring 300. Therefore, the different height of the tuning ribs 350 may influence the spacing between the reflector 100 and garnish ring 300 during connection. In another embodiment, the tuning ribs 350 may have different heights so that the reflector 100 may be angled relative to the garnish ring 300 when connected. This embodiment may allow a reflector to be tilted with respect to the vehicle bumper 500.

Figure 6:
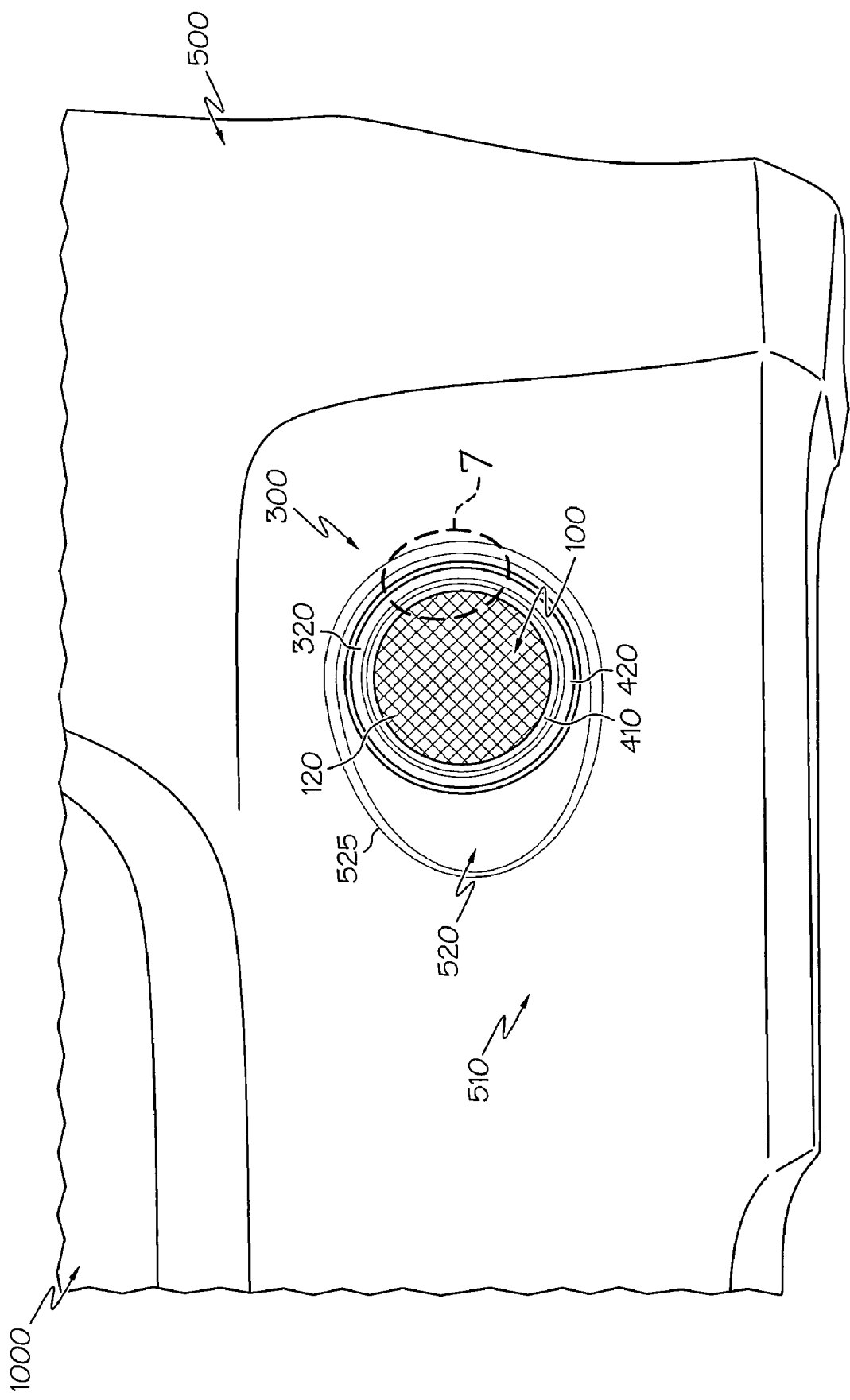
FIG. 6 depicts a vehicle bumper with a reflector assembly housed within a receptacle according to one or more embodiments shown and described herein.

Referring now to FIG. 6, a portion of a vehicle 1000 is shown with a vehicle bumper 500. A receptacle 520 is disposed in the bumper cover 510 of the bumper 500. A reflector 100 and garnish ring 300 are connected within the receptacle 520. A reflective surface 120 of the reflector 100 faces outward from the vehicle 1000. A peripheral ring 320 of the garnish ring 300 surrounds the reflector 100 so the reflective surface 320 may be accented by the peripheral ring 320. A substantially uniform gap 410 is circumferentially disposed between the reflector 100 and the garnish ring 300 while a substantially uniform gap 420 is circumferentially disposed between the garnish ring 300 and the bumper cover 510.

It should be understood that one or more receptacles 520 may be disposed in the bumper cover 510 to house additional reflector assemblies. In one embodiment, two receptacles 520 may be disposed on different ends of a vehicle bumper 500 thereby allowing a reflector assembly to be housed on both ends of a vehicle 1000. In another embodiment, the garnish bracket 530 may be disposed flush on the surface of the bumper cover 510. For example, the receptacle 520 may be relatively shallow or flush with the vehicle bumper 500 so that the reflector assembly 50 may rest even with, or even protrude from, the bumper cover 510.

Figure 7:
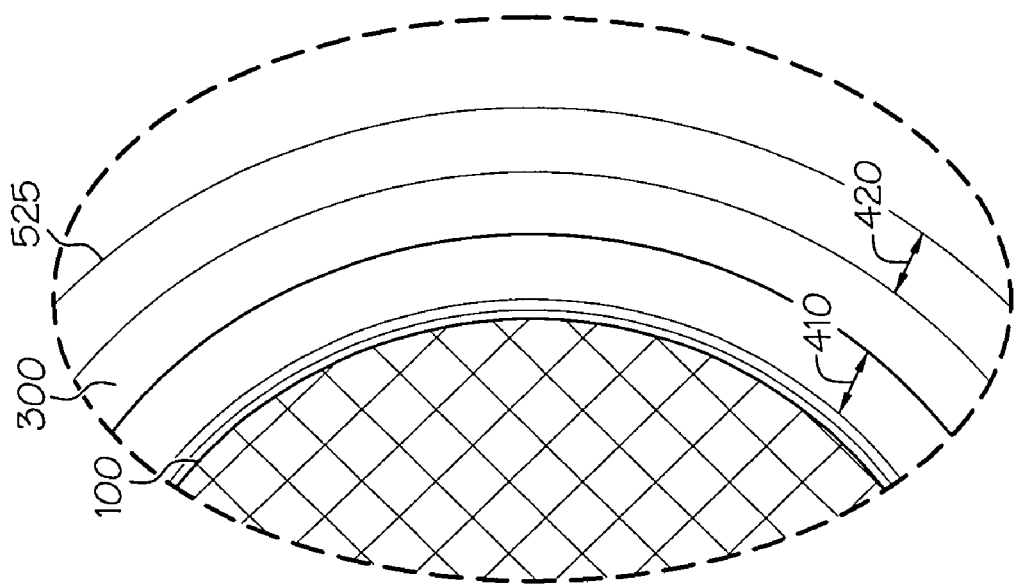
FIG. 7 depicts a close-up view of a portion of an installed reflector assembly.

Referring now to FIG. 7, by connecting the reflector 100 directly to the garnish ring 300 and the garnish ring 300 directly to the bumper cover 510, the garnish ring may be datumed to the bumper cover 510 and the reflector 100 may be datumed to the garnish ring 300. This arrangement facilitates independently aligning the garnish ring and reflector such that the spacing between the garnish ring 300 and the bumper cover 510 and the spacing between the reflector 100 and the garnish ring 300 may be precisely controlled. As shown in FIG. 7, a first gap 410 may be present between the reflector 100 and the garnish ring 300 while a second gap 420 may be present between the garnish ring 300 and the receptacle edge 525 when the reflector assembly is installed in the receptacle. The first gap 410 may be established by the connection between the reflector 100 and the garnish ring 300. For example, in one embodiment, the first gap 410 may be established by the reflector stud-reflector bracket connection. The second gap 420 may be established by the connection between the garnish ring 300 and the garnish bracket 530 of the bumper cover 510. More specifically, in one embodiment, the second gap 420 may be established by clips on the garnish ring 300 engaging with connector openings on the garnish bracket 530.

In one embodiment, the gap between the reflector 100 and garnish ring 300 may be about 0.5 mm and the gap between the garnish ring 300 and the bumper cover 510 may be about 1 mm. However, it should be understood that gaps of various other dimensions may be present depending on the configuration of the vehicle bumper 500 and the desired specifications.

It should now be understood that the independently aligned garnish ring and reflector of the reflector assembly described herein may be used, among other things, to connect and align a reflector to a garnish ring independent of connecting and aligning a garnish ring to a vehicle bumper. The use of independently aligned garnish rings and reflectors improves the finished appearance of the vehicle while reducing the time required to install and align the reflector assembly, which, in turn, may reduce the manufacturing cost of the vehicle.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

We claim:

1. A bumper assembly for a vehicle comprising a bumper cover having a garnish ring and a reflector disposed therein, wherein:
   the garnish ring comprises a plurality of garnish connectors extending from a backside of the garnish ring and a reflector bracket comprising a reflector connection hole;
   the bumper cover comprises at least one receptacle comprising a garnish bracket disposed in the receptacle with a clearance hole and a plurality of connector openings corresponding to the plurality of garnish connectors, wherein the garnish bracket forms a rear wall along an interior of the receptacle and, when the garnish ring is positioned in the at least one receptacle, the plurality of garnish connectors are received in the connector openings of the garnish bracket thereby aligning the garnish ring with the bumper cover and the clearance hole of the garnish bracket with the reflector connection hole of the reflector bracket; and
   the reflector comprises a connector post extending from a backside of the reflector, wherein, when the reflector is disposed in the garnish ring, the connector post extends through the reflector connection hole and the clearance hole such that the reflector is aligned with the garnish ring.

2. The bumper assembly of claim 1 wherein the plurality of garnish connectors are substantially hook-shaped clips.

3. The bumper assembly of claim 1 wherein the garnish ring further comprises a peripheral ring surrounding the reflector bracket.

4. The bumper assembly of claim 1 wherein the reflector further comprises an anti-rotation pin and the reflector bracket comprises an anti-rotation hole for receiving the anti-rotation pin of the reflector.

5. The bumper assembly of claim 4 wherein the garnish bracket of the bumper cover comprises an anti-rotation pin gap, wherein, when the garnish ring is installed in the receptacle, the anti-rotation pin gap is aligned with the anti-rotation hole such that the anti-rotation pin of the reflector passes through both the anti-rotation hole and the anti-rotation pin gap.

6. The bumper assembly of claim 5 wherein the garnish ring further comprises tuning ribs to control the orientation of the reflector with respect to the garnish ring.

7. A vehicle having a bumper assembly comprising a bumper cover, a garnish ring and a reflector, wherein:
   the bumper cover comprises a garnish bracket disposed in a receptacle of the bumper cover, the garnish bracket comprising a clearance hole and at least one connector opening, wherein the garnish bracket forms a rear wall along an interior of the receptacle;
   the garnish ring comprises a reflector connection hole and a garnish connector, wherein the garnish connector is disposed in the at least one connector opening of the bumper cover such that the garnish ring is aligned and connected to the bumper cover and the clearance hole of the bumper cover is aligned with the reflector connection hole; and
   the reflector comprises a connector post, wherein the reflector is disposed in the garnish ring such that the connector post extends through the reflector connection hole and the clearance hole and is secured to the bumper cover with a nut thereby securing the reflector and garnish ring to the bumper cover and aligning the reflector with the garnish ring.

8. The vehicle of claim 7 wherein the garnish connector comprises a substantially hook-shaped clip.

9. The vehicle of claim 7 wherein a peripheral surface of the garnish ring has a chrome finish.

10. The vehicle of claim 7 wherein the reflector further comprises an anti-rotation pin configured to be received by a reflector anti-rotation hole in the garnish ring.

11. The vehicle of claim 10 wherein the garnish bracket further comprises an anti-rotation pin gap configured to receive the anti-rotation pin.

12. The vehicle of claim 7 wherein a gap between the garnish bracket and the garnish ring is less than about 1 mm and the gap between the garnish ring and the reflector is less than about 0.5 mm.

13. A method of installing a reflector assembly in a bumper of a vehicle comprising:
   providing a bumper cover comprising a receptacle having a garnish bracket disposed in the receptacle, wherein the garnish bracket forms a rear wall along an interior of the receptacle;
   providing a reflector assembly comprising a garnish ring and a reflector;
   inserting the garnish ring in the receptacle of the bumper cover such that the garnish ring is datumed to the bumper cover; and
   inserting the reflector into the garnish ring such that the reflector is datumed to the garnish ring.

14. The method of claim 13 wherein the receptacle comprises a connector opening operable to receive a garnish connector of the garnish ring.

15. The method of claim 14 wherein the garnish connector constrains the garnish ring in at least two directions relative to the bumper cover.

16. The method of claim 13 wherein the garnish ring comprises a reflector bracket with a reflector connection hole for receiving a corresponding connector of the reflector.

17. The method of claim 16 wherein the corresponding connector of the reflector is a threaded reflector stud.

18. The method of claim 17 further comprising threading a reflector nut on the threaded reflector stud after the reflector has been installed in the garnish ring.

19. The method of claim 13 wherein the garnish ring comprises at least one reflector anti-rotation hole configured to receive an anti-rotation pin disposed on the reflector and the garnish bracket comprises at least one anti-rotation pin gap configured to receive the anti-rotation pin of the reflector.

20. The method of claim 19 further comprising aligning the anti-rotation pin gap of the garnish bracket with the anti-rotation hole of the garnish ring and inserting the anti-rotation pin of the reflector through the anti-rotation hole and the anti-rotation pin gap.

\* \* \* \* \*